United States Patent Office 3,575,900
Patented Apr. 20, 1971

3,575,900
ELECTROSTATICALLY SPRAYABLE ALUMINUM-PIGMENTED PAINTS AND PROCESS FOR PRODUCING SAME
Charles A. Ponyik, Jr., Maple Heights, Ohio, assignor to Mobil Oil Corporation
No Drawing. Filed Mar. 18, 1969, Ser. No. 808,306
Int. Cl. C09d 3/64, 3/74, 5/24
U.S. Cl. 260—21                     7 Claims

ABSTRACT OF THE DISCLOSURE

A resin such as a vinyl chloride copolymer is dissolved in an oxygen-containing solvent, such as methyl ethyl ketone, and an aluminum pigment paste is dispersed therein. The proportion of hydrocarbon solvent is increased until the resin precipitates colloidally on the aluminum pigment to form a concentrate in which the aluminum particles are protected. The concentrate can be incorporated in paints which are electrostatically sprayable.

---

The present invention relates to the aluminum pigmentation of resin-containing coating solutions, and especially to the provision of such coating solutions which can be electrostatically atomized or sprayed without having the electrostatic atomizing force short circuit to ground through the aluminum pigment contained in the coating solution being atomized.

An important electrostatic spray technique involves pumping a column of paint to an electrostatically charged surface which frequently takes the form of a slowly rotating metal cup which is maintained at a high potential with respect to a grounded object. The paint forms a liquid film on the charged cup and is atomized directly by the electrostatic potential which may be either positively or negatively charged, usually the latter.

When the paint is pigmented with aluminum pigment, the pigment particles (aluminum flakes) tend to become aligned in the paint and the electrostatic potential discharges to ground through the aligned aluminum particles. The arcing which takes place can cause fires, but even when danger is ignored, the electrostatic atomization process is disrupted and spray efficiency and tolerable voltage are reduced.

Even where spray is mechanical, the aluminum pigment tends to ground a charge imposed on the column of paint pumped to the spray head (as a result of the equipment being grounded) and this minimizes the charge on the sprayed particles which reduces electrostatic deposition as evidenced by reduced "wrap around" which is the capacity to coat the sides and rear of the grounded part being painted.

A primary purpose of the invention is to enable such aluminum-pigmented paint to be electrostatically atomized while reducing or eliminating the tendency for the charge to be grounded through the paint as aforesaid and increasing the electrostatic deposition as evidenced by improved "wrap around."

It is known to attempt to deal with this situation by providing the aluminum pigment particles with an insulating coating, but this has required expensive treatments which, to at least some extent, have degraded the desired metallic appearance provided by the aluminum pigment.

Moreover, aluminum pigmented solution coating compositions of the prior art tend to encounter a condition known as hard settling in which the pigment settles to the bottom of the paint and resists efforts to redisperse it. The solutions of the invention also tend to settle, but the sediment redisperses easily.

In accordance with the invention, a paste is formed in which the aluminum pigment is dispersed in a solvent which is a nonsolvent for the resin to be relied upon in the solution coating. This paste is then added to a solution of the resin in a more active solvent. The solvent in the paste either alone or together with additional nonsolvent reduces the solubility of the resin in its solution to the point of causing small amounts of resin to precipitate and deposit on the aluminum particles which function as nuclei or seeds for the precipitating resin which deposits on the aluminum in colloidal form. The result is an aluminum pigmented resin solution in which the aluminum pigment is protected by the colloidally precipitated resin and this solution can be used as such or mixed into solutions of other resins so long as the solvent system as a result of admixture is not altered to the point of either causing gross precipitation of resin or dissolution of the colloidally precipitated resin.

Since the precipitated resin functions to insulate the aluminum particles from one another, it is convenient to refer to the resin on the pigment particles as encapsulating such particles. However, the use of the term "encapsulate" is not intended to denote that the aluminum particles are completely enveloped.

The particular nature of the aluminum flakes used is of secondary significance, the invention being particularly concerned with nonleafing aluminum pigments. However, leafing aluminum pigments are also contemplated. Also, it is possible to reduce the shorting tendency of aluminum-pigmented paints by utilizing aluminum pigment of extremely fine particle size. While the invention is preferably directed toward aluminum pigment of more conventional size range, the use of very fine aluminum pigment does not eliminate the shorting problem completely and there is still a limit to the voltage which can be used without shorting. In the invention, higher voltages can be used before shorting takes place so that atomization, or "wrap around," or both, are improved. Also, the use of very fine aluminum pigment introduces color matching problems which are not encountered using the more conventionally sized pigment.

From the standpoint of the resins which are utilized in the solution coating composition, it is particularly preferred to employ copolymers of vinyl chloride which contain from about 60 to about 90% by weight of vinyl chloride in the copolymer, the balance of the copolymer being monoethylenically unsaturated monomer copolymerizable with the vinyl chloride. These copolymers are soluble in oxygen-containing solvents such as ketones like acetone or methyl ethyl ketone or other oxygen-containing solvents such as ester solvents illustrated by butyl acetate. These oxygen-containing solvents constitute the main portion of a well known class of solvents which are known to the art as active solvents for vinyl resins. These are effective to dissolve the vinyl chloride copolymers referred to and a proportion of nonsolvent diluent may also be tolerated.

It will be appreciated that the specific selection of active solvent will vary with the resin to be dissolved, but the class of solvents which are significantly better solvents than liquid hydrocarbons is well known. These active solvents may be used alone or in admixture and include such diverse solvents as dimethyl formamide, dimethyl acetamide, isophorone, carbitol acetate, ethyl aceto acetate. and dioxane.

The nonsolvents are liquid hydrocarbons which may be aliphatic or aromatic. The mononuclear aromatic hydrocarbons such as benzene, toluene, xylene and the like are quite effective since their introduction slowly weakens the dissolving capacity of the active solvent but, on the other hand, aliphatic hydrocarbons such as mineral spirits and naphtha and the like are particularly effective from the standpoint of causing the resin to precipitate in colloidal form.

While the vinyl chloride component and its proportion reasonably characterize the vinyl chloride copolymers which are preferably employed in the invention, the balance of the copolymer may be illustrated by vinyl acetate and vinylidene chloride and acrylic and methacrylic esters such as methyl, ethyl, butyl, isobutyl and 2-ethylhexyl acrylate and methacrylate.

It is also desirable to include small proportions of monomers aiding adhesion, such as acrylic or methacrylic acid, or maleic acid or anhydride, or to include minor proportions of reactive monomers such as an hydroxy functional monomer illustrated by hydroxy ethyl methacrylate or allyl alcohol. The point remains that the vinyl chloride content of the copolymer determines, to a large extent, the overall characteristics of the copolymer and its solubility. Accordingly, the invention will be illustrated utilizing a commercial copolymer containing 86% by weight of vinyl chloride, 13% by weight of vinyl acetate and 1% of maleic acid. Such a resin is commercially available from Union Carbide Corp., where it is identified by the trade designation "VMCH."

While vinyl chloride copolymers are utilized in the preferred practice of the invention, any other resin having similar solubility characteristics may be utilized. Among these are copolymers containing a major weight proportion of vinylidene chloride, styrene or methyl methacrylate, such as an 85/15 weight ratio copolymer of vinylidene chloride and vinyl chloride, an 85/15 weight ratio copolymer of styrene and ethyl acrylate, or an 85/15 weight ratio copolymer of methyl methacrylate and ethyl acrylate, and the like. These are easily dissolved in the oxygen-containing solvents referred to hereinbefore, but they are significantly less soluble in the liquid hydrocarbons so that, and by introduction of appropriate proportions of liquid hydrocarbon, and especially mineral spirits or naphtha and the like, a solution of the resin in an active solvent can be modified to cause the colloidal precipitation which is needed in the invention.

It will also be understood that the invention is subject to considerable procedural variation. Thus, the resin can be dissolved in active solvent, e.g., VMCH can be dissolved in methyl ethyl ketone and mineral spirits, and toluol can be added slowly with agitation until the aluminum pigment (which is introduced in the form of a paste with the mineral spirits) is protected by the colloidal precipitate which takes place. Interestingly, the fact of colloidal precipitation can be checked by omitting the aluminum pigment so that it can be seen that the addition of hydrocarbon solvent in fact causes a clouding of the resin solution.

To illustrate the variation which can be effected, the VMCH can first be wet with the toluol nonsolvent and then dissolved in methyl ethyl ketone. Once the resin is dissolved, the aluminum paste containing mineral spirits can be added slowly to bring the final dispersion to the same point which is achieved in the procedure discussed hereinbefore, so that the aluminum pigment is protected by the colloidal precipitate which is achieved.

The point to be noted is that the resin is first dissolved and then caused to precipitate colloidally either as the aluminum paste is added, or after it has been added. If some colloidal particles of resin are present before addition of the aluminum, this is not helpful and more precipitation must be obtained either as the aluminum is added or thereafter, It should be kept in mind that the colloidal precipitation which takes place is observable in a clear system where a cloudiness to one extent or another of the solution can be noted. On the other hand, in the novel procedure of the invention, the aluminum pigment is present and this masks the cloudiness of the solution which might otherwise be seen.

After the aluminum paste has been incorporated in the solution of selected resin and colloidal precipitation effected, the dispersion so-obtained can be used as such or combined with numerous other resins, e.g., polyester resins such as conventional short, medium and long oil alkyds and with aminoplast resins illustrative of which are urea-formaldehyde condensates and melamine-formaldehyde condensates and benzoguanamine-formaldehyde condensates. The prime caution is that when the resin dispersions of the invention are blended with other resins, the solvent systems used in connection with these other resins should not be either so rich in active solvents or so rich in liquid hydrocarbons as to significantly alter the solvent capacity of the solvent mixture which is produced when the vinyl resin or other similar resin is caused to colloidally precipitate to encapsulate and protect the aluminum pigment particles.

The pigmented vinyl resin systems of the present invention are particularly contemplated for use in conjunction with mixtures of short oil alkyd resins and aminoplast resins. As is well known, a short oil alkyd is a polyester of a phthalic acid, and especially phthalic anhydride, with a polyhydric alcohol such as glycerine or pentaerythritol and the like and which includes from 18–45 parts per 100 parts of alkyd of an oil component which may be constituted by a drying, semi-drying or non-drying oil or a fatty acid derived therefrom. These are illustrated by soya oil, linseed oil, caster oil, dehydrated castor oil, or fatty acids derived therefrom, including tall oil.

The invention is illustrated in the following examples.

EXAMPLE 1

7 parts of a copolymer of 86 weight percent vinyl chloride, 13 weight percent vinyl acetate and 1 weight percent maleic acid are dissolved in 133 parts of methyl ethyl ketone to provide a clear solution to which is added 254 parts of a paste containing nonleafing aluminum pigment dispersed in mineral spirits (65% aluminum pigment/35% mineral spirits). The paste is added with agitation and mixed to provide a stiff mixture which is vigorously agitated to effect complete breakup of the aluminum paste. 133 parts of toluol are then added to weaken the solvent and the mixture is thoroughly blended. 133 additional parts of toluol are added to cause the colloidal precipitation referred to hereinbefore. This last addition of toluol is carried out slowly since it causes the colloidal precipitation referred to and it is desired that the precipitation be very fine and take place progressively with the aluminum flakes serving as nuclei or seeds for the precipitating vinyl copolymer.

There is produced by the procedure indicated above a pigment concentrate in which the aluminum pigment is protected by the precipitated vinyl resin.

EXAMPLE 2

A coating solution is formulated by blending a plurality of short oil alkyd resins and aminoplast resins as noted in the following table:

| Parts by weight | Component |
|---|---|
| 2,667 | Short oil alkyd (38% soya oil/43% phthalic anhydride/glycerin)—55% non-volatile solids in xylol. |
| 1,625 | Short oil alkyd (38% tall oil/41% phthalic anhydride/equi-parts pentaerythritol/glycerin)—45% non-volatile solids in 50/50 xylol/mineral spirits. |
| 1,422 | Short oil alkyd (41% linseed oil/41% phthalic anhydride/glycerin)—45% non-volatile solids in 50/50 aromatic hydrocarbon/mineral spirits. |
| 1,288 | Urea-formaldehyde condensate—50% non-volatile solids in 50/50 xylol/butanol. |
| 836 | Melamine-formaldehyde condensate—50% non-volatile solids in 50/50 xylol/butanol. |
| 106 | Petrolatum grease (20% solution in aromatic hydrocarbon solvent). |
| 149 | Toluol. |
| 159 | V. M. & P. Naphtha.[1] |
| 98 | 20% solution ethyl cellulose in 50/50 xylol/butanol. |
| 24 | Optional dimethyl silicone surface active agent (2% solution). |
| 728 (66.38%) [2]—Talc | All in the form of a dispersion in a short oil alkyd: 38% tall oil; 40% phthalic anhydride glycerin (50% non-volatile solids in xylol). |
| 19 (69.55%) [2]—Ferrite yellow | |
| 7 (80.74%) [2]—Titanium dioxide | |
| 47 (52.35%) [2]—Lamp black | |
| 100 | Toluol. |

[1] Distillation range: Initial boiling point, 245° F; Mid boiling point, 263° F.; final boiling point, 287° F. Kauri-butanol value of 36–41.
[2] Agent named is dispersed in alkyd to obtain the total solids content identified.

The above provides a coating solution which is electrostatically sprayable and which, if directly pigmented with the aluminum paste provided in Example 1, would be difficult to electrostatically spray because of the tendency of the high voltage used (usually in the range of 10–60 k.v.) to short out through the aluminum pigment in the coating composition. On the other hand, when the aluminum pigment concentrate of Example 1 is incorporated by simply intimately blending the product of Example 1 with the product of Example 2, then the electrostatic charge does not short circuit through the composition, electrostatic atomization can be utilized, and then mechanical spray is used to atomize the paint, the electrostatic charge can be applied to the column of paint which is pumped to the mechanical sprayer to provide charged particles which exhibit excellent wrap around on a grounded target.

The aluminum-pigmented solution coating in which the pigment concentrate of Example 1 is blended into the product of Example 2, has a #4 Ford Cup viscosity at 77° F. of 45–55 seconds and is diluted to desired spray viscosity by addition of aromatic hydrocarbon solvent. Spray viscosity is normally in the range of 10–20 seconds (#4 Ford Cup). Films electrostatically applied using the pigmented coating solution and having a thickness of 1.0–1.2 mils can be conveniently cured by baking the same for 14 minutes at 350° F. and form coatings having a 60° gloss reading of 45–55.

The invention is defined in the claims which follow.

I claim:

1. A method for producing an aluminum-pigmented paint which is adapted to receive an electrostatic charge with improved resistance to the tendency of the charge to short circuit through the aluminum pigment comprising, dissolving a vinyl resin which is insoluble in liquid hydrocarbons in an oxygen-containing organic active solvent for said resin to form a solution, adding to said solution a paste in which the aluminum pigment is dispersed in a liquid hydrocarbon, the proportion of liquid hydrocarbon which is added with said paste, or otherwise, being regulated to cause said resin to precipitate colloidally on said aluminum pigment to thereby provide a pigment concentrate in which the pigment is protected by colloidally deposited resin thereon, and incorporating said pigment concentrate in a paint, the solvent system of which does not significantly disturb the solvency of said resin in said concentrate.

2. A method as recited in claim 1 in which said resin is a vinyl chloride copolymer containing 60–90% by weight of vinyl chloride with the balance of the copolymer being monoethylenic monomer copolymerizable therewith.

3. A method as recited in claim 2 in which the liquid hydrocarbon added to said solution comprises aliphatic hydrocarbon solvent.

4. A method as recited in claim 2 in which said liquid hydrocarbon comprises a mixture of aliphatic and aromatic hydrocarbon solvents.

5. A method as recited in claim 1 in which said paint comprises alkyd resin and aminoplast resin.

6. A method as recited in claim 5 in which said alkyd resin is a short oil alkyd.

7. A paint produced by the method recited in claim 1.

References Cited

UNITED STATES PATENTS

| 2,343,925 | 3/1944 | Pike | 260—21 |
| 3,210,316 | 10/1965 | Merck et al. | 260—39 |
| 3,389,105 | 6/1968 | Bolger | 260—23 |
| 3,409,585 | 11/1968 | Hagemeyer et al. | 260—41 |

DONALD E. CZAJA, Primary Examiner

R. W. GRIFFIN, Assistant Examiner

U.S. Cl. X.R.

106—290, 308; 204—181; 260—22, 23, 31.2 32.4, 32.8, 33.6, 39, 40, 41, 850

PO-1050
(5/69)

UNITED STATES PATENT OFFICE
CERTIFICATE OF CORRECTION

Patent No. 3,575,900     Dated April 20, 1971

Inventor(s) Charles A. Ponyik, Jr.

It is certified that error appears in the above-identified patent and that said Letters Patent are hereby corrected as shown below:

Column 5, line 22, "7(80.74%)" should read --72(80.74%)--.
Column 5, line 26, "dentified" should read --identified--.
Column 5, line 39, "then" should read --when--.

Signed and sealed this 7th day of September 1971.

(SEAL)
Attest:

EDWARD M. FLETCHER, JR.
Attesting Officer

ROBERT GOTTSCHALK
Acting Commissioner of Pat